Nov. 8, 1955  E. HOLROYD ET AL  2,723,330
APPARATUS FOR ELECTRICALLY BUTT-WELDING WIRE ENDS
Filed Sept. 12, 1952  4 Sheets-Sheet 1

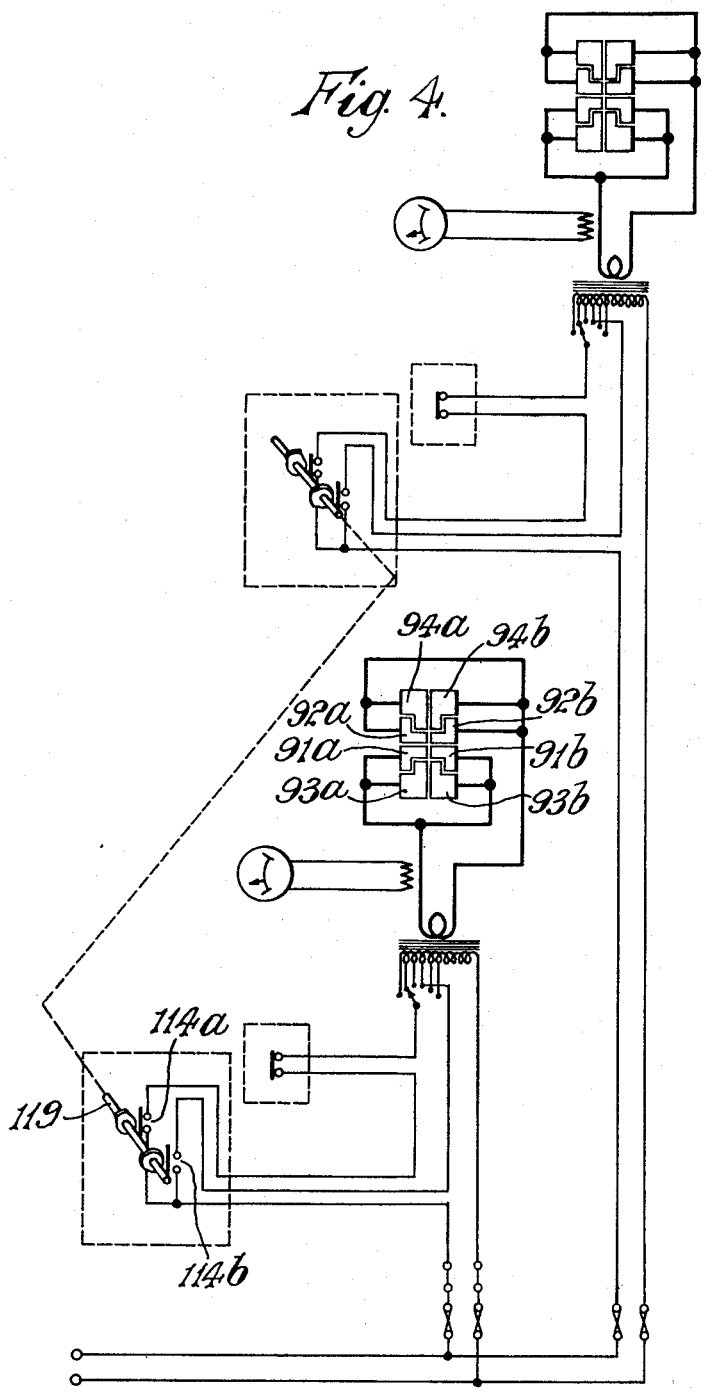

United States Patent Office 2,723,330
Patented Nov. 8, 1955

2,723,330

APPARATUS FOR ELECTRICALLY BUTT-WELDING WIRE ENDS

Eric Holroyd, Speke, Liverpool, and Desmond Lawson Jenkins, Kirkby, England, assignors to Dunlop Tire and Rubber Corporation, Buffalo, N. Y., a corporation of New York Application September 12, 1952, Serial No. 309,211

6 Claims. (Cl. 219—4)

This invention relates to electric welding apparatus for making a butt joint between ends of wire and more particularly to apparatus for use in the production of endless loops of wire to be used in the manufacture of cycle tire bead wires.

Apparatus for welding together the ends of a loop of wire is known in which an operative inserts a shaped cut loop of wire between upper and lower welding jaws acting as conductors for an electric current, the current being supplied through a timing control, and after completion of the welding stage the welded loop is removed by the operative from the welding jaws and placed between two further conductor jaws, at a different location, which are also supplied with current through a timing control whereby the welded loop is annealed in the vicinity of the joint.

Our present invention provides apparatus wherein the welding and annealing steps can be carried out without moving the position of the wire loop between the welding and the annealing stages.

According to the invention electric welding apparatus for making a butt joint between two ends of wire comprises pairs of opposed conductor jaws, adapted to hold the ends of wire in abutting relationship located side by side and so arranged that the wires are heated first in the vicinity of the ends to weld the joint and then at positions more remote from the joint in order to anneal the joint.

Preferably the apparatus will have four pairs of jaws the inner two of which act as welding jaws and the outer jaws as annealing jaws and is provided with means for opening the inner jaws automatically on the completion of the weld.

It is further more preferred to construct the conductor jaw arrangement with four upper and lower conductor jaws each separately and pivotally mounted, the two outer sets being adapted for the annealing step and the two inner sets of jaws for the welding step, one set of upper and lower welding jaws and an adjacent set of upper and lower annealing jaws being mounted as a unit for lateral movement with respect to the remaining sets of jaws, said unit of jaws being urged by a compression spring towards the remaining sets of jaws, cam means for urging and holding away said unit from said remaining sets until butted ends of wire are inserted in the jaws and an arm on said unit of jaws adapted to operate a microswitch to switch off the welding current, whereby when butted ends of wire are inserted in the jaws they hold the unit and remaining sets of jaws apart against the action of the spring until, on fusion of the wire after switching on the welding current, the unit of jaws is urged by the compression spring towards the remaining sets of jaws and through consequent movement of the arm attached to said unit the welding current is switched off.

The invention will now be described, by way of example, with reference to a particular embodiment of welding and annealing head in which a cut, shaped, loop of wire is received into the conductor jaws from transfer means described in copending application of Crabbe and Holroyd, Ser. No. 309,074, filed September 11, 1952, now U. S. Patent 2,708,228, granted May 10, 1955, and with reference to the accompanying drawings in which—

Fig. 4 is a diagram of the main electrical connections for the welding and annealing circuit.

Figure 1:
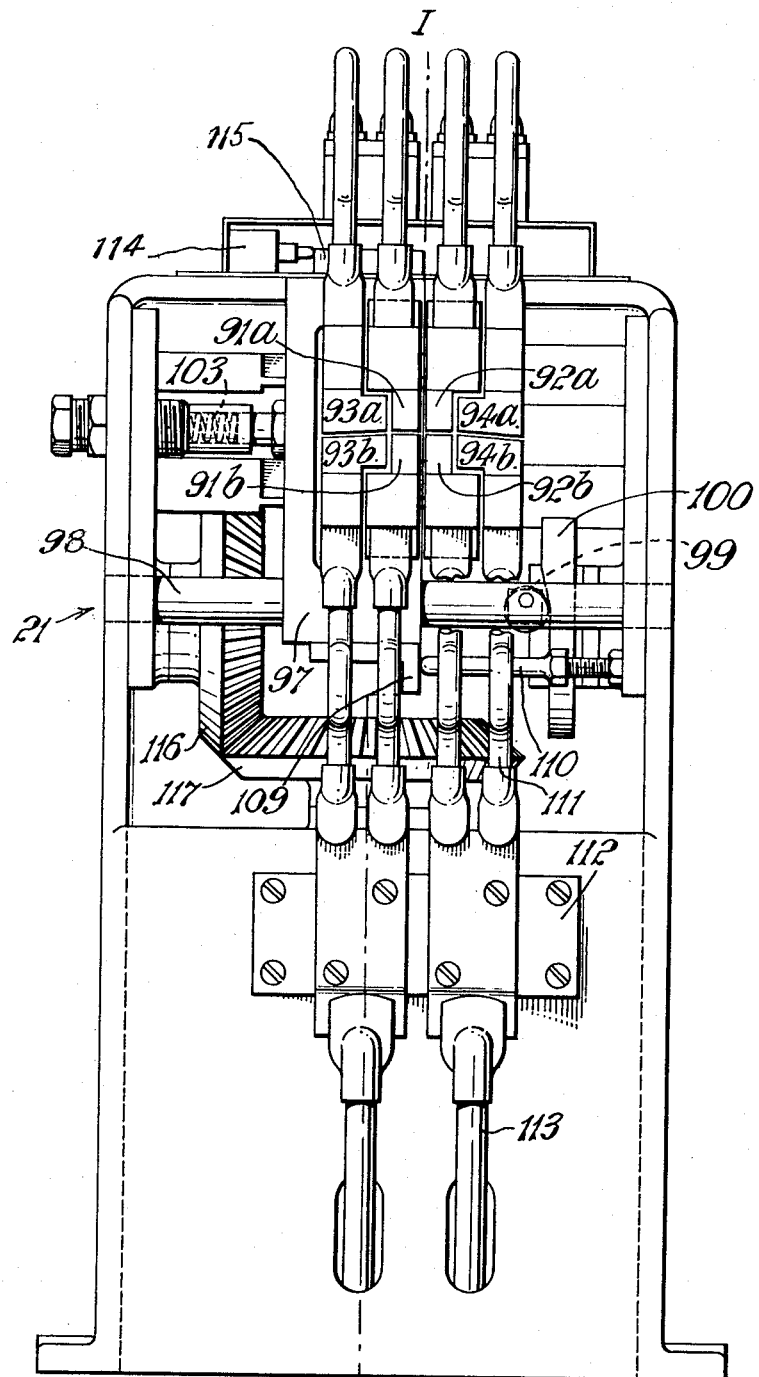
Fig. 1 is a detailed front elevation of the welding and annealing unit.
Figure 2:
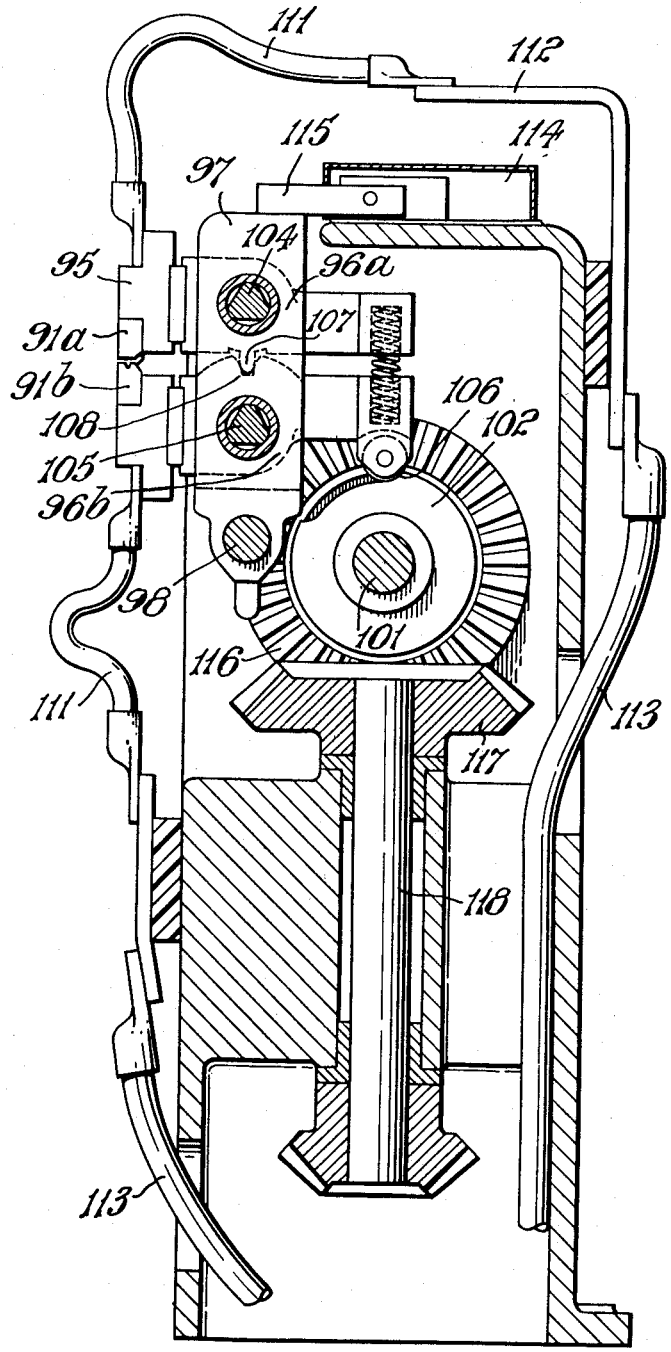
Fig. 2 is a cross-section on the line I—I of Fig. 1 viewed from the right hand side.
Figure 3:
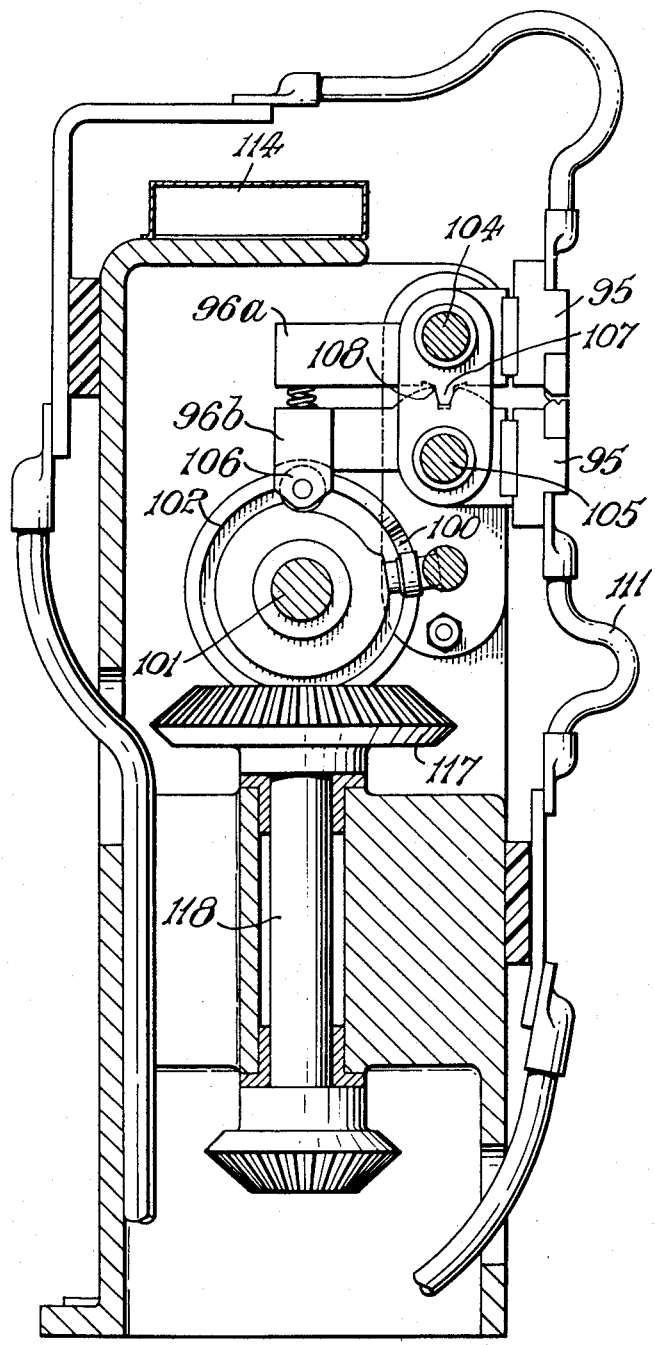
Fig. 3 is a cross-section on the line I—I of Fig. 1 viewed from the left hand side.

The welding unit consists of a pillar-like casing in which is mounted a welding and annealing head. This head, see Figs. 1, 2 and 3, consists of left hand upper and lower conductor welding electrodes $91^a$ and $91^b$, and left hand upper and lower annealing electrodes $93^a$ and $93^b$, right hand upper and lower welding electrodes $92^a$ and $92^b$, and right hand upper and lower annealing electrodes $94^a$ and $94^b$. Each of the electrodes is mounted in an electrode holder 95, Figs. 2 and 3, carried by and electrically insulated from fingers $96^a$ and $96^b$. The left hand electrodes $91^a$ and $91^b$, Fig. 1, and $93^a$, $93^b$ are contained as a unit in a box-like structure 97 slidable on guide shafts 104, 105. To this left hand electrode assembly is secured a push rod 98 having a roller follower 99 which engages with cam 100 mounted on shaft 101 which also carries cams 102 for effecting pivotal movement of the fingers $96^a$ and $96^b$ for the opening and closing of the electrodes. A compression spring 103 on the left hand side of the electrode assembly 97 urges the latter towards the right hand electrodes against the action of the cam 100. The fingers $96^a$ and $96^b$ are separately and pivotally mounted on the shafts 104, 105 and carry roller followers 106 which engage the cams 102. Fingers $96^a$ carrying the upper electrodes have a single tooth 107 which engages a groove 108 in the fingers $96^b$ carrying the lower electrodes. The portion of shafts 104, 105 on which the left hand box-like structure 97 slides is triangular in section to facilitate such sliding movement. Stop plate 109 and pin 110 are provided for limiting movement of the left hand electrode assembly 97. The electrode holders 95 for each of the welding or annealing electrodes are connected by flexible cables 111 to bus bars 112 which are themselves connected to cables 113 leading to a transformer in the base of the pillar-like casing. An arm 115 secured to the top of the assembly 97 is adapted to engage a microswitch 114 fitted to the top of the casing and operates this switch on inward movement of the assembly 97 which follows the formation of the weld as will be later described.

The cam shaft 101 for operating the fingers $96^a$, $96^b$ and the inward movement of the left hand electrode assembly 97 is driven through a bevel gear 116 meshing with a bevel gear 117 on a shaft 118 driven from a suitable main drive.

Automatic switching and timing of the welding and annealing operations is controlled by the cams on a shaft 119, Fig. 4, which in turn operate a welding microswitch $114^a$ and an annealing microswitch $114^b$ in the primary circuit of the welding transformer. The circuit through the switch $114^a$ comprises more coils of the transformer primary than does the circuit through the switch $114^b$ to provide more energy for welding than for the subsequent annealing. Cam shaft 119 closes and opens first switch $114^a$ and then $114^b$.

In operation a cut loop is placed between the open jaws of the welding unit. Through the appropriate cams 102 the jaws close on the loop and the welding current is then switched on by microswitch $114^a$. Before the current is switched on the rotation of cam 100 at the right hand side of the welding head and consequent movement of its roller follower 99 is such as would permit the left hand jaw assembly 97 to move from its spaced apart position toward the right hand sets of jaws, but this movement is prevented at this stage by the resistance offered by the butted ends of the wire loop. The butted ends of the shaped loop fuse on the application of the current and form the butt joint at the same time giving rise to a flash. The consequent shortening of the wire permits the inward movement of the left hand assembly 97 and the welding current is switched off through movement of arm 115 which operates the microswitch 114, the welding jaws are then opened by cams 102 and subsequent switching on the annealing current through cam 114$^b$. As the welding jaws are open, the annealing current passes to the wire only through the annealing jaws when the annealing current is switched on. On completion of annealing the annealing current is switched off, the annealing jaws opened by their appropriate cams 102 and the welded loop removed from the open jaws.

Whereas in the embodiment just described one pair of welding jaws and one pair of annealing jaws are movable as a unit toward and away from the remaining pairs of jaws, in an alternative construction one pair of welding jaws only is movable toward the other pair of welding jaws, both pairs of annealing jaws remaining relatively in fixed spaced apart relationship.

The welding head of this invention is, as indicated previously, particularly adapted for use in the assembly of units described in our co-pending application Ser. No. 309,074, filed September 11, 1952, now U. S. Patent 2,708,228 granted May 10, 1955, for the automatic and repetitive production of cycle tire bead wire from wire stock.

Having described our invention, what we claim is:

1. An electric welding machine which comprises a pair of parallel supporting shafts, a pair of electrode carriers each carrier comprising a pair of supporting arms, one arm of each carrier being rockably mounted on one of said supporting shafts and the other arm being rockably mounted on the other shaft, the arms of one of said electrode carriers being slidable as a unit on said supporting shafts toward the arms of the other electrode carrier, a spring pressing the slidable arms of the one electrode carrier toward the arms of the other electrode, a cam to move the slidable arms of the one electrode carrier as a unit away from the arms of the other electrode carrier, electrodes mounted and insulated one on each of said arms, a spring acting to rock the arms of each electrode carrier to bring the electrodes mounted thereon into gripping engagement and a cam to rock said arms in the reverse direction against the action of said springs to separate their respective electrodes.

2. The machine of claim 1 in which one of said arms has a recess extending radially toward the axis of its supporting shaft and the other arm has a tooth extending radially into and engaging said recess.

3. The electric welding machine of claim 1 having mounted and insulated on each supporting arm an annealing electrode, the welding electrodes being between the annealing electrodes of the pair of electrode carriers.

4. Electric welding machine for butt welding the ends of a wire loop which comprises, a pair of parallel supporting shafts, a pair of electrode holders slidably mounted on said shafts, pressure applying means to move one of said electrode holders toward the other, a cam to separate said electrode holders at intervals, each electrode holder comprising at successive distances from the wire ends a pair of welding electrodes and a pair of annealing electrodes, each pair being resiliently pressed to grip said wire, a pair of electrode opening cams to open successively said pair of welding electrodes and said pair of annealing electrodes and an electric circuit of variable energy to supply successively a welding current and then an annealing current of lesser energy.

5. The welding machine of claim 4 in which said circuit supplies said annealing current after said welding electrodes are opened.

6. The welding machine of claim 4 in which said circuit comprises a step down transformer having its secondary connected in series with said electrode holders, a divided primary having an annealing circuit of a lesser number of turns and a welding circuit of a greater number of turns, and a timing switch to open said welding circuit as said welding electrodes are opened.

References Cited in the file of this patent
UNITED STATES PATENTS

| | | |
|---|---|---|
| Re. 19,542 | Williams | Apr. 16, 1935 |
| 2,627,009 | Corson | Jan. 27, 1953 |